(12) United States Patent
Spring (10) Patent No.: US 7,141,901 B2
(45) Date of Patent: Nov. 28, 2006

(54) DOWNHOLE TORQUE-GENERATING AND GENERATOR COMBINATION APPARATUS

(76) Inventor: Gregson William Martin Spring, 7 Great Calcroft, Defford Road, Pershore, Worcestershire WR10 1OS (GB)

( * ) Notice: Subject to any disclaimer, the term of this patent is extended or adjusted under 35 U.S.C. 154(b) by 155 days.

(21) Appl. No.: 10/476,435

(22) PCT Filed: May 1, 2002

(86) PCT No.: PCT/GB02/01990

§ 371 (c)(1),
(2), (4) Date: Oct. 30, 2003

(87) PCT Pub. No.: WO02/091553

PCT Pub. Date: Nov. 14, 2002

(65) Prior Publication Data

US 2004/0144570 A1    Jul. 29, 2004

(30) Foreign Application Priority Data

May 5, 2001    (GB) .................................. 0111124.4

(51) Int. Cl.
*H02K 7/10*      (2006.01)
*H02K 49/00*     (2006.01)
*H02K 15/00*     (2006.01)
*H02K 47/04*     (2006.01)
*E21B 4/00*      (2006.01)

(52) U.S. Cl. .................... 310/77; 310/93; 310/113; 175/104

(58) Field of Classification Search ................ 310/113, 310/76, 77, 112, 92–95; 175/104
See application file for complete search history.

(56) References Cited

U.S. PATENT DOCUMENTS 1,183,006 A  *  5/1916  Hatz ........................... 322/64

(Continued)

FOREIGN PATENT DOCUMENTS

EP           0520733           12/1992

(Continued)

OTHER PUBLICATIONS

Internation Search Report Aug. 16, 2002.

*Primary Examiner*—Tran Nguyen
*Assistant Examiner*—Erik Preston
(74) *Attorney, Agent, or Firm*—Ira S. Dorman (57) ABSTRACT

A combination of a torque-generating apparatus with an alternator/generator. The torque-generating apparatus comprises a first assembly (10, 25) including a generally cylindrical member of magnetically soft material and having a longitudinal axis, and a second assembly (2) arranged coaxially within the first assembly and including an electromagnetic winding (4). The first assembly (10, 25) and the second assembly (2) are rotatable relative to each other about the axis. Relative rotation between the first (10, 25) and second (2) assemblies induces a magnetic field which generates rotational torque between the first and second assemblies. Rectification means (31) is provided to convert alternating current electrical output from the alternator/generator (22) to provide D.C. current to the electromagnetic windings (4) of the torque generating apparatus to generate an electromagnetic braking effect.

41 Claims, 6 Drawing Sheets

U.S. PATENT DOCUMENTS

| | | | |
|---|---|---|---|
| 3,448,305 A * | 6/1969 | Raynal et al. | 310/17 |
| 3,459,980 A * | 8/1969 | Coroller | 310/114 |
| 4,675,852 A * | 6/1987 | Russell et al. | 367/84 |
| 4,707,643 A * | 11/1987 | Rohr et al. | 318/77 |
| 4,713,567 A | 12/1987 | Fey et al. | |
| 5,146,433 A * | 9/1992 | Kosmala et al. | 367/83 |
| 5,197,040 A * | 3/1993 | Kotlyar | 367/84 |
| 5,444,321 A * | 8/1995 | Honda et al. | 310/263 |
| 5,517,464 A * | 5/1996 | Lerner et al. | 367/84 |
| 5,875,859 A * | 3/1999 | Ikeda et al. | 175/73 |
| 5,962,947 A * | 10/1999 | Suzuki et al. | 310/257 |
| 6,092,610 A * | 7/2000 | Kosmala et al. | 175/61 |
| 6,191,561 B1 * | 2/2001 | Bartel | 322/51 |

FOREIGN PATENT DOCUMENTS

| | | |
|---|---|---|
| EP | 0728908 | 8/1996 |
| FR | 2289802 A * | 7/1976 |

* cited by examiner

DOWNHOLE TORQUE-GENERATING AND GENERATOR COMBINATION APPARATUS

This invention relates to a combination of a torque-generating apparatus with a generator/alternator. More particularly, but not exclusively, the invention relates to such a combination for down hole use in drilling applications.

BACKGROUND OF THE INVENTION

The presently preferred power generator in oilfield exploration or extraction applications is the mud alternator because it is powerless on the surface, and therefore safe to handle, and only generates power once down hole and spinning in the mud flow. However, one of the major problems faced by both the provider and end-user of drilling equipment has been the control of impeller speed of down hole mud alternators.

All mud alternators effectively run open loop and the only way to govern their speed is either to modify the flow rate of mud pumped past the impeller or to change the impeller. These methods are not always successful in controlling alternator speed and, hence, power output. An alternator that rotates too quickly generates too much voltage for the down hole apparatus and consequently causes the apparatus to overheat. If an alternator causes the apparatus to overheat for too long, the apparatus is likely to fail resulting in a costly interruption of the drilling programme. A loss of down hole power results in a loss of communication with the drilling apparatus and the entire drill string must be pulled from the well to effect repairs. For an extended reach hole, the extraction, repair and replacement can take in excess of two days and a drilling engineer therefore avoids excessive rotation speeds for the alternator if at all possible.

To ensure the alternator is always operated within safe limits, the alternator RPM or output voltage is transmitted to the surface at frequent intervals in order that the drilling engineer may monitor the performance of the alternator and effect alternator speed corrections by adjusting the mud pumping-rate.

The preferred method for avoiding excessive rotation speed for the alternator is to select a suitable impeller for the alternator during the planning stage of a drilling contract. Mud flow rates can vary widely, for example from 150 to 800 United States gallons per minute. One of the planning tasks is to establish the minimum and maximum mud flow rates for the task in order that an optimum impeller can be selected. The difficulty with this method is that an incorrect impeller is sometimes fitted to the alternator. The drilling engineer is then faced with the decision of not using the drilling apparatus until the correct impeller has been fitted, or risking damage to the drilling apparatus due to excessive alternator power output.

BRIEF SUMMARY OF THE INVENTION

There is therefore a requirement to be able to control alternator speed in order to avoid excessive power outputs.

Furthermore, present apparatus is vulnerable to the aggregation of mud and debris leading to clogging of the machinery and down hole failure.

U.S. Pat. No. 4,713,567 describes an electromagnetic brake device for a sports training apparatus which includes a rotor (first assembly) including a generally cylindrical member of magnetically soft material and a longitudinal axis, and a stator (second assembly) arranged coaxially within the rotor and including an electromagnetic winding. The rotor and the stator are rotatable relative to each other about the axis. Relative rotation between the rotor and the stator induces a magnetic field which generates rotational torque between the rotor and stator assemblies, and rectification means is provided to convert alternating current electrical output from the generator to provide D.C. current to the electromagnetic windings of the torque generating apparatus to generate an electromagnetic braking effect.

It is an object of the present invention to provide a combination of a torque generating apparatus with an alternator/generator capable of fulfilling at least some of the above requirements.

According to the present invention there is provided a combination of a torque-generating apparatus with an alternator/generator, the torque-generating apparatus comprising: a first-assembly including a generally cylindrical member of magnetically soft material and having a longitudinal axis, a second assembly arranged coaxially within the first assembly and including an electromagnetic winding, the first assembly and the second assembly being rotatable relative to each other about the axis, the arrangement being such that relative rotation between the first and second assemblies induces a magnetic field which generates rotational torque between the first and second assemblies, and rectification means is provided to convert alternating current electrical output from the alternator/generator to provide D.C. current to the electromagnetic windings of the torque generating apparatus to generate an electromagnetic braking effect, and characterised in that the torque-generating apparatus and the alternator/generator are positioned axially adjacent one another on a common shaft.

A "magnetically soft material" is a material which is not capable of being substantially permanently magnetised, but which becomes magnetised whilst in an externally applied magnetic field.

The first assembly may be a rotor assembly of the apparatus for producing rotational torque and the second assembly may be a stator assembly of the torque generating apparatus.

The second assembly may comprise a magnetically soft steel.

The first and second assemblies may be separated by a narrow gap.

The first assembly may be disposed so as substantially to surround the second assembly.

The first assembly may be substantially solid or may be formed from a plurality of laminations.

The second assembly may be substantially solid or may be formed from a plurality of laminations.

A number of generally longitudinal grooves may be provided to the inside surface of the cylindrical member of the first assembly. The grooves may be substantially parallel to the longitudinal axis of the first assembly. Alternatively, the grooves may be provided so as to form at least a partial helix around the longitudinal axis of the first assembly.

The second assembly may be provided with a number of pole pieces extending generally radially from the longitudinal axis thereof. The pole pieces of the second assembly may be provided with an electromagnetic winding, adjacent poles being magnetisable in opposite directions. Means may be. provided to control the degree of the magnetisation. Gaps between the pole pieces may be filled with a potting material. The surface of the second assembly may be covered with a layer of soft magnetic or non-magnetic material.

The first assembly may be provided with external rotation means such as an impeller adapted to rotate the first assembly, the impeller being adapted to be disposed in use within a moving fluid, the motion of the fluid acting upon the impeller so as to rotate the first assembly.

The alternator/generator may be provided with external rotation means, such as an impeller adapted to rotate the alternator/generator, the impeller may be adapted to be disposed in use within a moving fluid, the motion of the fluid acting upon the impeller so as to rotate the alternator/generator. The impeller may be an integral part of a magnet carrier of the alternator/generator.

The electrical output of the alternator/generator may be connected directly to the electromagnetic winding of the torque-generating apparatus or may be connected indirectly by way of alternator voltage regulation means to create the electromagnetic braking effect.

Where the electrical power of the alternator/generator is connected directly to the electromagnetic winding of the torque-generating apparatus, the electromagnetic braking effect may be modified by varying the resistance of the winding, for example with one or more external resistances or by changing the gauge of the winding wire, or by varying the gap between the first and second assemblies of the torque-generating apparatus.

Where the electrical output of the alternator/generator is connected indirectly to the electromagnetic winding of the torque-generating apparatus, the alternator voltage regulation means may function to provide a progressive braking effect and/or to effect braking at a predetermined set point. The predetermined set point may be determined by the voltage output of the alternator/generator. The predetermined set point may be variable.

For a better understanding of the present invention and to show more clearly how it may be carried into effect, reference will now be made, by way of example, to the accompanying drawings which show schematically various embodiments of the present invention. The figures may not be to scale. In the drawings.

BRIEF DESCRIPTION OF THE SEVERAL VIEWS OF THE DRAWINGS

DETAILED DESCRIPTION OF THE INVENTION

Figure 1:
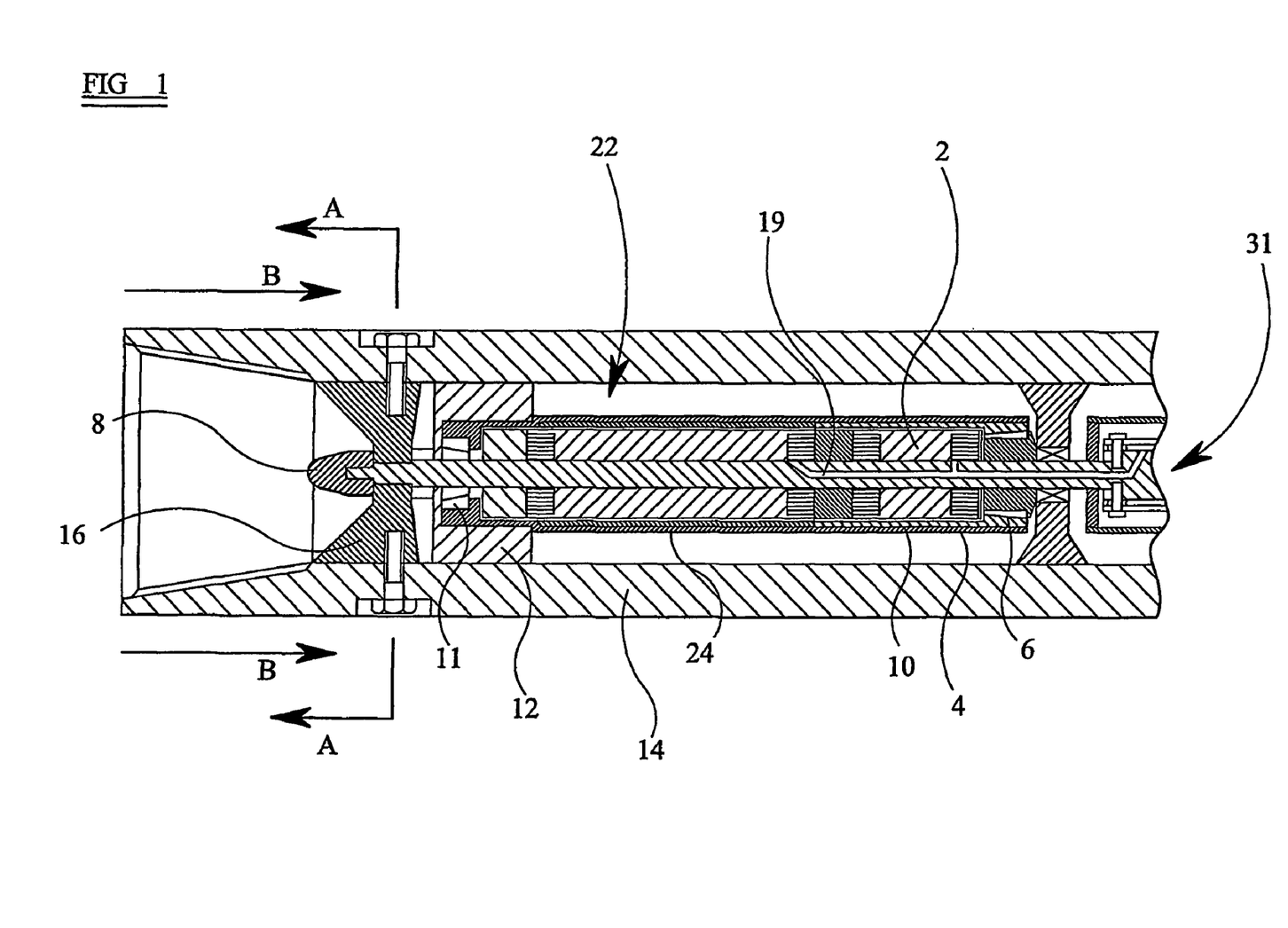
FIG. 1 is a cross-sectional view of an embodiment of a combination according to the present invention.

FIG. 1 shows a combination of a torque generating apparatus and alternator/generator suitable for use in drilling apparatus. The torque generating apparatus comprises a second assembly in the form of a cylindrical stator 2. The stator 2 is shown in more detail in FIGS. 4 to 7. The stator is made of magnetically soft material and is provided with stator windings 4 arranged so that, when energised, the stator 2 is magnetised as discussed below. The stator is mounted on a fixed shaft 8. Surrounding the stator is a first assembly in the form of a magnetically soft steel rotor 10. The rotor 10 is mounted on the stator 2 by way of bearings 6, 11, such as thrust bearings. The rotor/stator assembly is contained within a cylindrical housing 14 which may typically be a section of drill collar. The assembly is supported by an anchor 16 which is bolted to the housing.

A three phase alternator 22 is provided on the same shaft as the torque-generating apparatus. The alternator 22 and the torque-generating apparatus share a common rotor.

The output voltage of the alternator is connected via rectification means 31 to the torquer stator windings so that the torquer provides negative feedback in the form of progressive braking as the rotational speed of the joint rotor assembly increases or when the rotational speed of the rotor exceeds a predetermined limit.

The stator windings 4 of the torque generating apparatus are connected to windings of the alternator by way of access holes 19 formed in the core of each apparatus as shown in FIG. 1.

In use, the combination is disposed down hole, drilling mud being pumped down the hole in the direction indicated. The moving drilling fluid acts on the impeller 12 so as to rotate the rotor 10.

Figure 14:
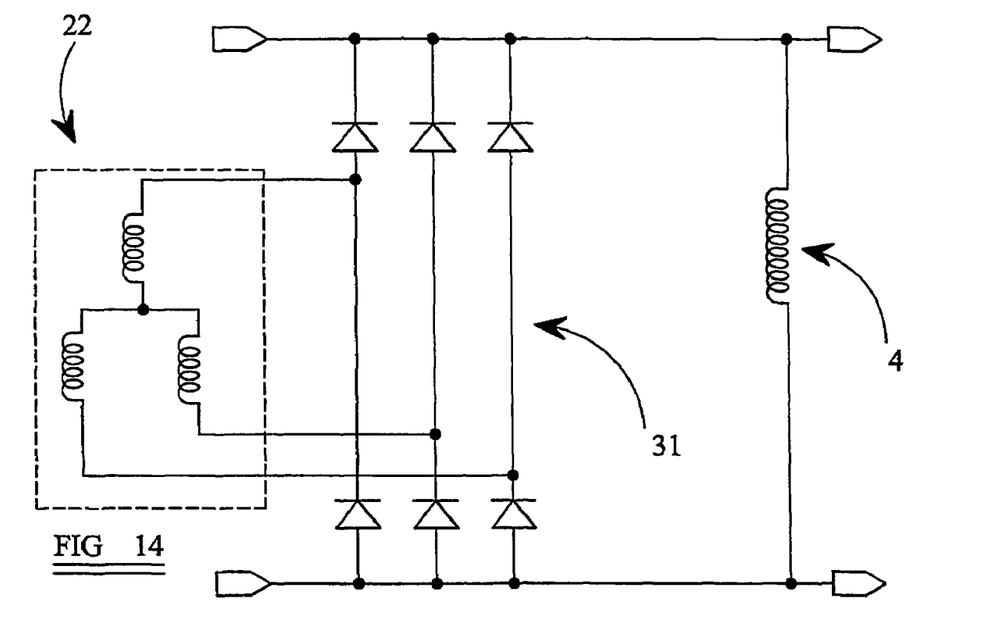
FIG. 14 is a schematic drawing of a rectifying means used in the combination of FIG. 1.

Mud alternators, such as the illustrated alternator 22, are generally three phase electrical rotating machines connected to a full wave rectifier 31 to convert the three alternating current waveforms into a single direct current supply. A typical circuit diagram is shown in FIG. 14. The impeller 12 is an integral part of a magnet carrier 24 of the alternator and spins at several thousand rpm in response to the flow rate of mud past the impeller. By electrically connecting the rectified output of the alternator 22 to the stator windings 4 of the torque-generating apparatus, an electromagnetic brake is created between the torque-generating apparatus and the alternator. Depending on the manner of the electrical connection, two different braking effects can be created as will be explained in more detail hereinafter.

Electrically connecting the stator windings 4 of the torque generating apparatus to the rectified output of the alternator 22 creates a progressive braking effect because the alternator 22 progressively energises the stator windings 4 with current. The greater the rectified alternator voltage, the greater the current flowing in the stator windings 4 and the greater the electromagnetic braking effect. The feedback loop created provides proportional control over the alternator output and the maximum speed of the alternator 22 is controlled irrespective of the profile of the impeller 12 and the mud flow rate. Such an electrical connection provides the more simple method of speed control within the alternator assembly and may be fine-tuned by varying either the resistance of the stator windings or the air/mud gap between the rotor and stator of the torque-generating apparatus. The resistance of the stator windings 4 may be modified by adding external resistors in series with the stator windings, or by changing the gauge of wire used to construct the stator windings. The total resistance, and hence the braking control achieved by either method, may be determined by calculation. Changing the air/mud gap involves a grinding operation to increase the gap between the rotor and stator of the torque-generating apparatus to reduce the braking effect.

Figure 15:
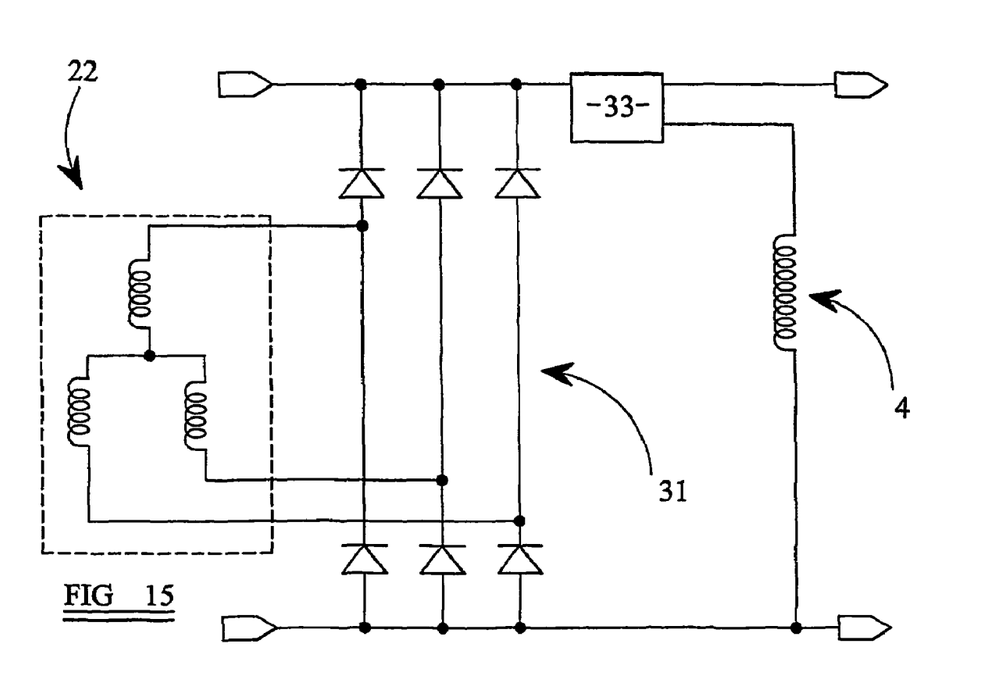
FIG. 15 is a schematic drawing of an alternative rectifying means incorporating an alternator voltage regulator device used in the combination of FIG. 1.

Alternatively, as shown in FIG. 15, the braking characteristics may be changed from proportional to any other form of control by providing an alternator voltage regulator device 33 between the alternator 22 and the torque-generating apparatus. A switch mode controller is preferred to minimise losses within the alternator voltage regulator device and offers the possibility of dynamically changing the speed characteristics down hole via mud pulse telemetry.

An alternator voltage regulator device can be used to apply both linear and/or non-linear braking characteristics to the alternator by way of the stator windings of the torque-generating apparatus. A typical circuit, shown in FIG. 15, comprises an alternator voltage regulator in the form of a programmable switch mode power supply deriving power from the rectified alternator output and supplying programmed power output to the stator windings 4 of the torque-generating apparatus. A predetermined or programmable voltage-sensitive trip device activates the switch mode power supply. Below the trip point, the alternator runs open loop and there is no induction braking. Above the trip point, the loop is closed and induction braking is applied to the alternator. In this manner the set point between open loop and closed loop control can be programmed at any chosen location on the alternator speed curve and may be tuned to vary the output voltage according to the requirements of different customers.

By coupling the alternator to a torque-generating apparatus, the alternator no longer operates open loop and can safely be left unattended down hole to monitor its own output. Manufacturers of down hole alternators need only provide one system for all customers instead of several impeller/alternator pairs for differing output power demands and variable mud flow rates. A single combined alternator and torque-generating apparatus may be programmed to reproduce the output power profiles corresponding to different impellers by limiting the output power with induction braking. Such an arrangement reduces design and manufacturing costs, simplifies the operational needs of field engineers, and improves down hole reliability of the alternator and down hole instrumentation.

Figure 2:
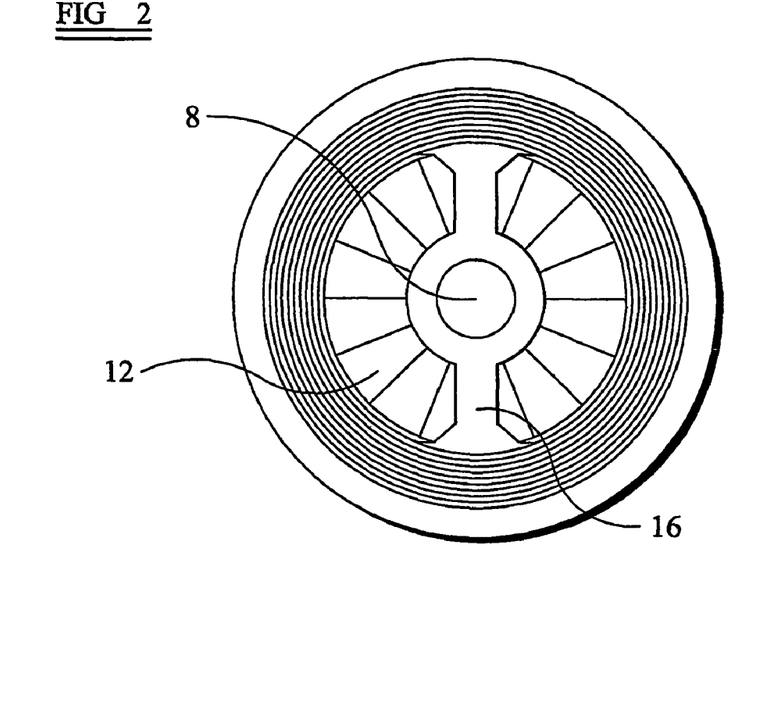
FIG. 2 is an end view of the combination of FIG. 1 looking in the direction of the arrow B.

FIG. 2 is an end view of the apparatus of FIG. 1. It shows the fixed shaft 8, anchor 16 and the impeller blades 12. The direction of mud flow in FIG. 2 is into the paper, causing rotation of the impeller blades.

Figure 3:
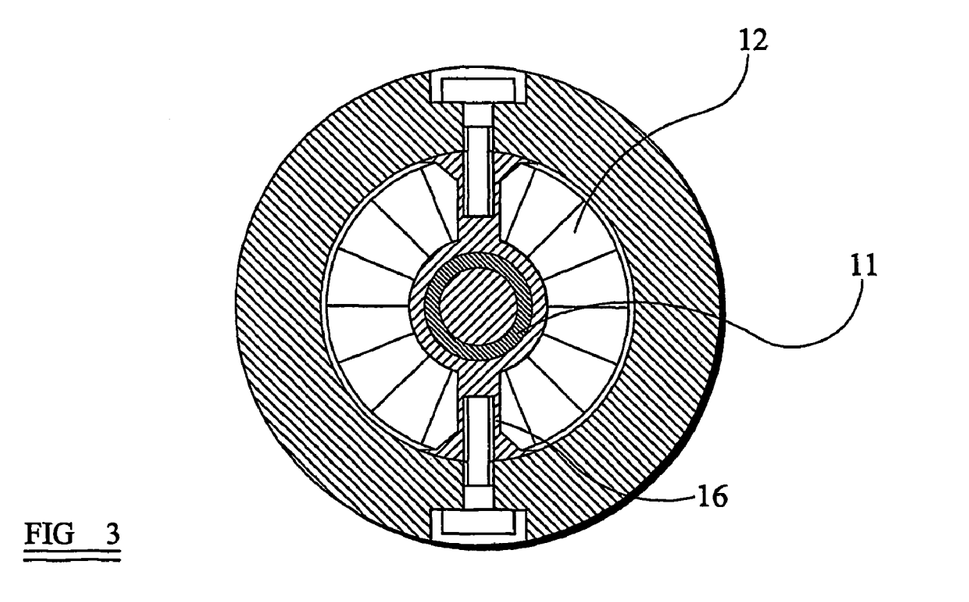
FIG. 3 is a cross-sectional view of the combination of FIG. 1 taken along the line A—A.
Figure 4:
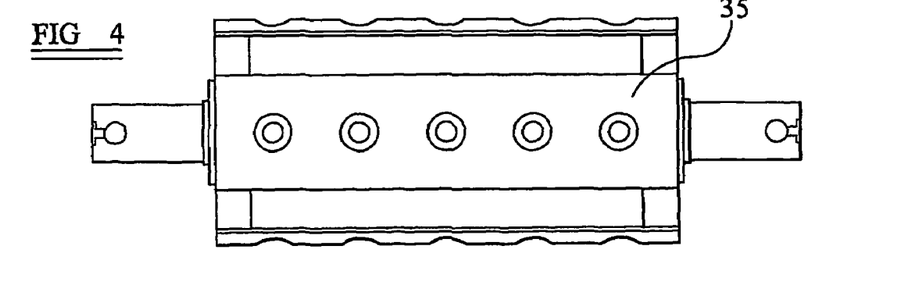
FIG. 4 is a more detailed view of a stator shown in FIG. 1.
Figure 5:
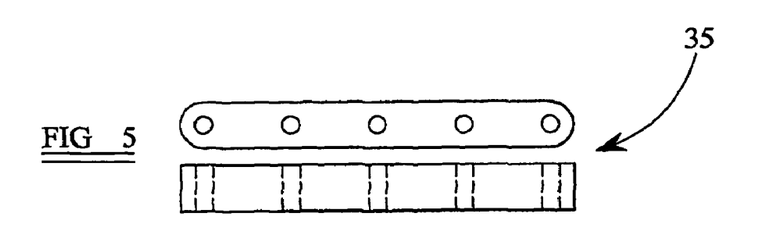
FIG. 5 shows two views of a stator pole piece.
Figure 6:
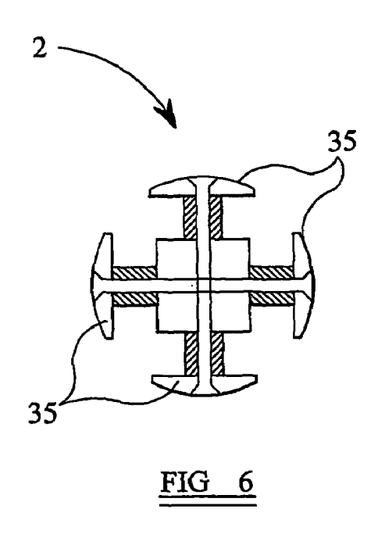
FIG. 6 is a cross-section of the stator shown in FIG. 4.
Figure 7:
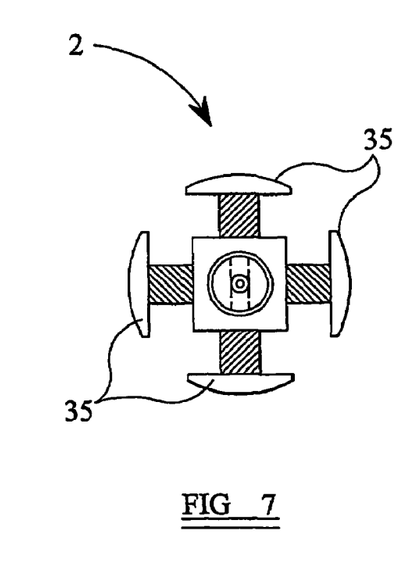
FIG. 7 is an end view of the stator shown in FIG. 4.

FIG. 3 shows a cross-sectional view as indicated in FIG. 1. The assembly anchor 16 is shown in cross-section, bolted to the drill collar housing. The shaft 8 can be seen in cross-section. The view in FIG. 3 is looking inwards into the assembly in the direction of the incoming mud, and the impeller blades 12 can be seen behind the assembly anchor 16.

FIGS. 4 to 7 are more detailed views of the stator assembly. The stator 2 of the torque generating apparatus is a simple four-pole electromagnet which forms the electrical and mechanical centre of the machine. The stator 2 has a central shaft from which radially project four pole pieces 35, as shown. The number of pole pieces need not be limited to four—any suitable number of pole pieces may be provided, larger machines requiring more pole pieces.

To prevent the stator 2 from being crushed by normal down hole drilling pressures, the gaps between the stator pole pieces may be filled with a high compressive strength material such as epoxy filler (not shown). This allows the stator 2 to maintain its shape and survive pressures in excess of 20,000 pounds per square inch.

Figure 10:
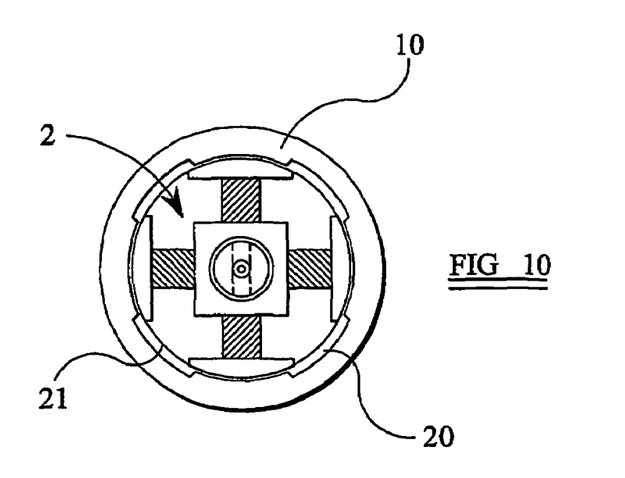
FIG. 10 is an end view detail of the rotor and stator assembly.

The stator 2 of the torque generating apparatus is wound with high-temperature-resistant enamelled copper wire (not shown in FIGS. 4 to 7) so as to produce alternate north and south magnetisation of the pole pieces. To preserve the integrity of the stator winding from the drilling mud, as shown in FIGS. 1 and 10 a thin sleeve of soft magnetic or non-magnetic material 21 is machined to cover the stator windings. End cheeks provided on the stator receive the sleeve 21 and are welded thereto to seal the assembly. This seals the edges of the stator 2 and protects the contents from contamination. The covering, for example in the form of a cylinder, allows the stator poles to rotate with respect to the rotor 10 whilst maintaining close magnetic contact. A small magnetic gap is required to create the high output torque reactions from this machine.

An important feature of the apparatus is the use of electromagnetic advantage to minimise the power demands of the stator 2. By its nature, this induction machine relies upon high rates of change of magnetic flux to effect braking in the rotor. High operating efficiency will therefore be achieved at high rotor RPM.

Figure 8:
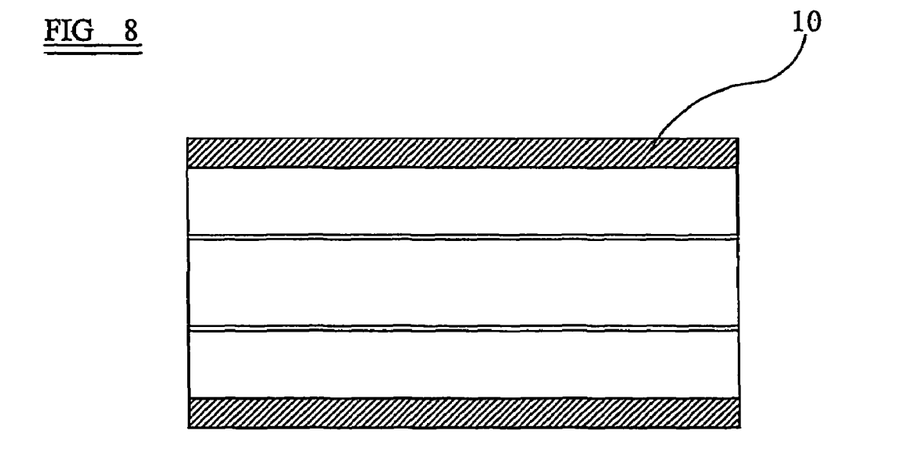
FIG. 8 is a sectional view of a rotor shown in FIG. 1.
Figure 9:
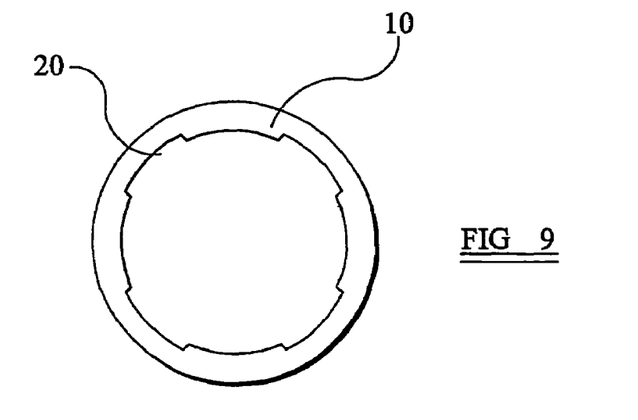
FIG. 9 is an end view of the rotor of FIG. 8.

FIGS. 8 to 10 show the rotor 10 of the torque generating apparatus in more detail. The rotor 10 consists of a simple steel cylinder having grooves 20 machined to the inside surface. The grooves 20 perform two important functions. They allow the rotor 10 and stator 2 to maintain close magnetic contact and at the same time allow a sufficient flow of drilling mud through the annular space between the rotor and stator. This aids lubrication of the rotor bearings 6 and 11 and allows dissipation of heat.

The grooves 20 also prevent mud particles from aggregating within the annular space and clogging the apparatus. If the annular space were too small, mud particles would become trapped due to low mud-flow velocities. The mud particles would quickly aggregate, binding the stator 2 and rotor 10 and causing a down hole failure. In conventional down hole electrical apparatus, like alternators, which use a permanent magnet rotor, failure frequently occurs due to mud material becoming trapped and clogged within the space between the rotor and stator. The clogging problem is compounded by both soft and hard magnetic particles that circulate within the mud. Once trapped by the strong magnetic fields within the permanent magnet rotor, the magnetic particles capture non-magnetic mud particles, accelerating clogging. The present apparatus avoids this type of failure by providing a more generous space between rotor and stator (due to the grooves) in the area of the torquer and by being composed of soft magnetic material which does not trap particles to the same extent as a permanent magnet.

An important feature of the torque generating apparatus is the use of electromagnetic advantage and a rotor 10, preferably solid, to dissipate waste heat from work done by the apparatus. The induced currents circulating in the rotor 10 would give rise to $I^2R$ heating in the rotor raising its working temperature. However, because the rotor 10 is manufactured from a magnetically soft material, its performance is unaffected by this temperature rise. It can therefore operate in temperatures much higher than the current limit of 180 C., without any loss of performance. In theory, the rotor 10 alone can operate at temperatures up to the Curie temperature of the permanent magnets.

According to another realisation of the rotor 10 of the torque generating apparatus, not shown in the figures, the grooves 20 are formed with a small flute or spiral twist along their length. In this way, every rotation of the rotor 10 produces a small pumping effect, pumping mud and contaminant particles through the apparatus. These features would expel hard and soft magnetic particles which would otherwise become trapped by the permanent magnets of the alternator windings.

The pole pieces of the stator 2 and the protruding portions of the rotor inner surface are disposed so as to correspond, being aligned (in the case of a four-pole apparatus) every quarter turn of the rotor 10. As discussed, the number of pole pieces and protruding portions may be varied to suit a particular application. Although the rotor 10 and stator 2 in this example are formed of magnetically soft steel, any suitable soft magnetic material may be employed. Similarly, the protective coating of the stator 2 may be made of ferrous or non-ferrous material.

Normal use of the torque generating apparatus may erode the inner surface of the rotor 10 and/or the protective coating of the stator 2. This would cause a gradual loss of output torque. The apparatus is, however, easy and economical to repair, as any mechanical errors may be easily corrected by welding, machining and/or grinding the relevant part.

Figure 11:
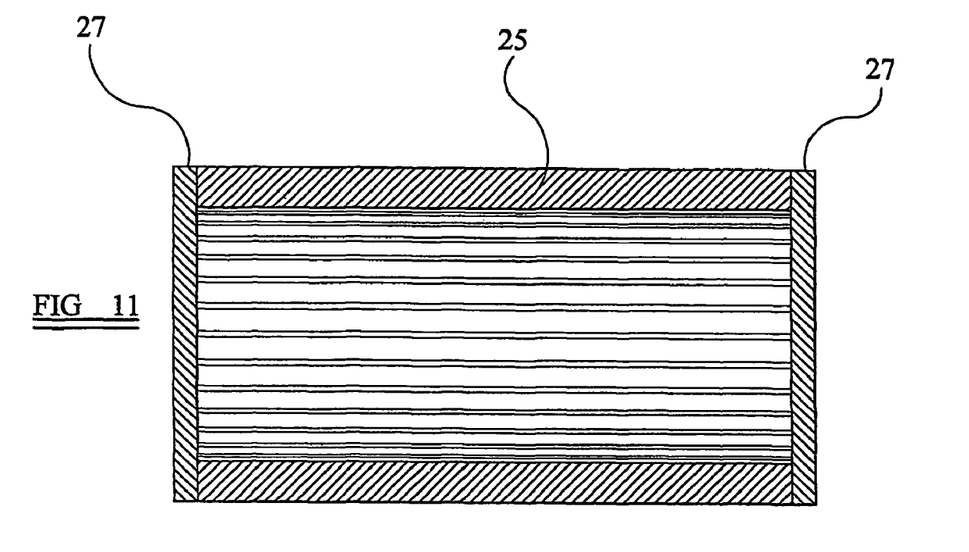
FIG. 11 is a cross-sectional view of another embodiment of a rotor similar to that shown in FIG. 1 showing a laminated structure.
Figure 12:
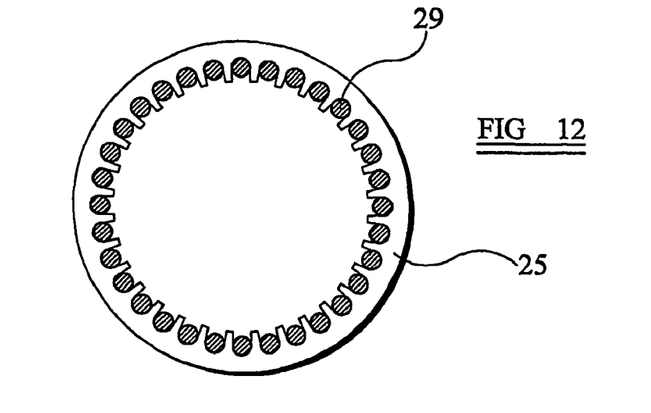
FIG. 12 is an end view, with an end cap removed, of the rotor of FIG. 11.
Figure 13:
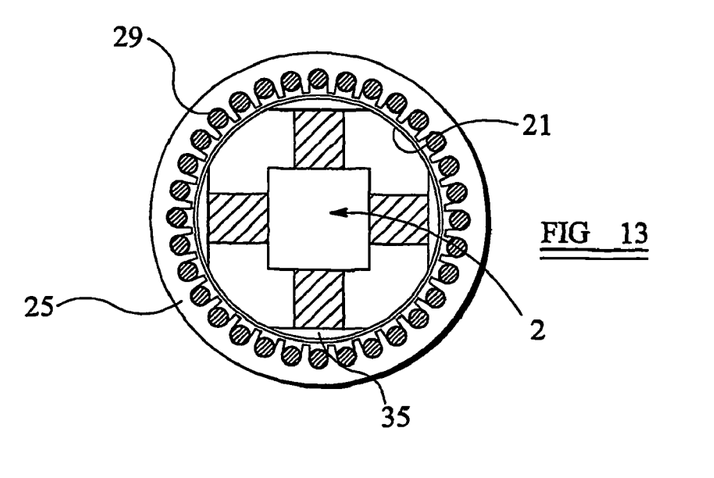
FIG. 13 is an end view detail, with an end cap removed, of a rotor and stator assembly incorporating the rotor of FIGS. 11 and 12.

FIGS. 11 to 13 show an alternative rotor 25 in more detail. The rotor 25 consists of a laminated steel cylinder having a number of conductors 29 running the length of the rotor 25. The conductors 29 are connected at each end of the rotor 25 by means of a conductor end cap 27. The arrangement of conductors 29 and end caps 27 form what is known as a squirrel cage conductor winding.

The conductors 29 and conductor end caps 27 consist of rods and plates of beryllium copper, which has a similar electrical resistivity to aluminium but is a stronger material, resistant to mechanical abrasion and chemical attack from drilling muds.

A close magnetic contact is still maintained between the rotor 25 and the stator 2.

It should be understood that the stator which can be in a solid or laminated form can be used in conjunction with either a solid or laminated rotor.

The invention claimed is:

1. A combination of a torque-generating apparatus and an alternator/generator positioned axially adjacent to one another on a common shaft (8), the torque-generating apparatus comprising: a first assembly (10, 25) including a generally cylindrical member of magnetically soft material and having a longitudinal axis, a second assembly (2) arranged coaxially within the first assembly and including an electromagnetic winding (4), the first assembly (10, 25) and the second assembly (2) being rotatable relative to each other about the axis; the alternator/generator incorporating a permanent magnet rotor; the combination further including rectifications means (31) for converting alternating current electrical output from the alternator/generator (22) to provide direct current to the electromagnetic winding (4) of the torque-generating apparatus, the voltage of which direct current is dependent upon the speed of rotation of the alternator/generator, whereby relative rotation between the first (10, 25) and second (2) assemblies of the torque-generating apparatus induces a magnetic field which generates rotational torque between the first and second assemblies to generate a progessive braking effect dependent on the voltage applied to the electromagnetic winding (4).

2. A combination as claimed in claim 1, wherein the first assembly is a rotor assembly (10, 25) of the torque generating apparatus for producing rotational torque and the second assembly (2) is a stator assembly of the torque generating apparatus.

3. A combination as claimed in claim 1, wherein the second assembly (2) comprises a magnetically soft steel.

4. A combination as claimed in claim 1, wherein the first (10, 25) and second assemblies (2) are separated by a narrow gap.

5. A combination as claimed in claim 1, wherein the first assembly (10, 25) is disposed so as to substantially surround the second assembly (2).

6. A combination as claimed in claim 1, wherein the first assembly is of a form selected from substantially solid (10) or is formed from a plurality of laminations (25).

7. A combination as claimed in claim 1, wherein the second assembly (2) is of a form selected from substantially solid or is formed from a plurality of laminations.

8. A combination as claimed in claim 1, wherein a number of generally longitudinal grooves (20) are provided to the inside surface of the cylindrical member of the first assembly (10).

9. A combination as claimed in claim 8, wherein the grooves (20) are substantially parallel to the longitudinal axis of the first assembly (10).

10. A combination as claimed in claim 8, wherein the grooves (20) are provided so as to form at least a partial helix around the longitudinal axis of the first assembly (10).

11. A combination as claimed in claim 1, wherein the second assembly (2) is provided with a number of pole pieces extending generally radially from the longitudinal axis thereof.

12. A combination as claimed in claim 11, wherein the pole pieces of the second assembly are provided with an electromagnetic winding, adjacent poles being magnetisable in opposite directions.

13. A combination as claimed in claim 11, wherein means is provided to control the degree of the magnetisation.

14. A combination as claimed in claim 11, wherein gaps between the pole pieces are filled with a potting material.

15. A combination as claimed in claim 11, wherein a surface of the second assembly (2) is covered with a layer selected from soft magnetic and non-magnetic material (21).

16. A combination as claimed in claim 1, wherein the first assembly (10, 25) is provided with external rotation means (12) adapted to rotate the first assembly (10, 25).

17. A combination as claimed in claim 16, wherein the external rotation means comprises an impeller (12).

18. A combination as claimed in claim 17, wherein the impeller (12) is adapted to be disposed in use within a moving fluid, the motion of the fluid acting upon the impeller so as to rotate the first assembly.

19. A combination as claimed in claim 1, wherein the alternator/generator (22) is provided with external rotation means (12).

20. A combination as claimed in claim 19, wherein the external rotation means comprises an impeller (12) adapted to rotate the alternator/generator (22).

21. A combination as claimed in claim 20, wherein the impeller (12) is adapted to be disposed in use within a moving fluid, the motion of the fluid acting upon the impeller (12) so as to rotate the alternator/generator (22).

22. A combination as claimed in claim 20, wherein the impeller (12) is an integral part of a magnet carrier of the alternator/generator (22).

23. A combination as claimed in claim 1, wherein the rectified electrical output of the alternator/generator (22) is connected directly to the electromagnetic winding (4) of the torque-generating apparatus to create the electromagnetic braking effect.

24. A combination as claimed in claim 23, wherein the electromagnetic braking effect can be modified by varying the resistance of the electromagnetic winding (4).

25. A combination as claimed in claim 24 wherein the resistance of the electromagnetic winding (4) can be modified by varying the resistance of the electromagnetic winding (4) with at least one external resistance.

26. A combination as claimed in claim 24 wherein the resistance of the electromagnetic winding (4) can be modified by changing the gauge of the winding wire.

27. A combination as claimed in claim 23 wherein in the electromagnetic braking effect can be modified by varying the gap between the first (10, 25) and second (2) assemblies of the torque-generating apparatus.

28. A combination as claimed in claim 1, wherein the rectified electrical output of the alternator/generator (22) is connected indirectly to the electromagnetic winding (4) of the torque-generating apparatus by way of alternator voltage regulation means to create the electromagnetic braking effect.

29. A combination as claimed in claim 1, wherein the progressive braking effect is activated at a predetermined set point.

30. A combination as claimed in claim 29, wherein the predetermined set point is determined by the voltage output of the alternator/generator (22).

31. A combination as claimed in claim 30 wherein the predetermined set point is variable.

32. A method of generating an electromagnetic braking effect in a combination of a torque-generating apparatus and an alternator/generator positioned axially adjacent to one another on a common shaft (8), the torque-generating apparatus comprising: a first assembly (10, 25) including a generally cylindrical member of magnetically soft material and having a longitudinal axis, a second assembly (2) arranged coaxially within the first assembly and including an electromagnetic winding (4), the first assembly (10, 25) and the second assembly (2) being rotable relative to each other about the axis; the alternator/generator incorporating a permanent magnet rotor; the combination further including rectification means (31) for converting alternating current electrical output from the alternator/generator (22) to provide a direct current voltage which is dependent upon the speed of rotation of the alternator/generator, the method including the step of applying the voltage to the electromagnetic winding (4) of the torque-generating apparatus whereby relative rotation between the first (10, 25) and second (2) assemblies of the torque-generating apparatus induces a magnetic field which generates rotational torque between the first and second assemblies to generate a progessive braking effect dependent on the voltage applied to the electromagnetic winding (4).

33. A method according to claim 32 and including the step of connecting the electrical output of the alternator/generator (22) directly to the electromagnetic winding (4) of the torque-generating apparatus to create the electromagnetic braking effect.

34. A method according to claim 33 and including the step of varying the resistance of the electromagnetic winding (4) to modify the electromagnetic braking effect.

35. A method according to claim 34, wherein the resistance of the electromagnetic winding (4) is modified with a least one external resistance.

36. A method according to claim 34, wherein the resistance of the electromagnetic winding (4) is modified by changing the gauge of the winding wire.

37. A method according to claim 33 and including the step of varying the gap between the first (10, 25) and second (2) assemblies of the torque-generating apparatus to modify the electromagnetic braking effect.

38. A method according to claim 32 and including the step of connecting the rectified electrical output of the alternator/generator (22) indirectly to the electromagnetic winding (4) of the torque-generating apparatus by way of alternator voltage regulation means to create the electromagnetic braking effect.

39. A method according to claim 38 and including the step of activating the progressive braking effect at a predetermined set point.

40. A method according to claim 39 wherein the predetermined set point is determined by the voltage output of the alternator/generator (22).

41. A method according to claim 40, wherein the predetermined set point is variable.

* * * * *